United States Patent
Daniel

(10) Patent No.: US 9,477,827 B1
(45) Date of Patent: Oct. 25, 2016

(54) APPARATUS, SYSTEM AND METHOD FOR AUTHENTICATING A PLURALITY OF USERS FOR A MOBILE DEVICE USING BIOMETRIC MEANS

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 230 days.

(21) Appl. No.: 13/744,138

(22) Filed: Jan. 17, 2013

Related U.S. Application Data

(60) Provisional application No. 61/587,239, filed on Jan. 17, 2012.

(51) Int. Cl.
G06F 21/00 (2013.01)
G06F 21/32 (2013.01)

(52) U.S. Cl.
CPC ..................... *G06F 21/32* (2013.01)

(58) Field of Classification Search
CPC ....... G06F 21/30–21/32; G06F 21/62–21/629
USPC ................. 726/16–20, 26, 28; 713/182–186; 382/115–127
See application file for complete search history.

(56) References Cited

U.S. PATENT DOCUMENTS

| | | | | |
|---|---|---|---|---|
| 7,139,414 B1* | 11/2006 | Suzuki | ............... | G06K 9/00053 340/5.52 |
| 7,212,885 B2* | 5/2007 | Diaz | .................... | A43D 117/00 345/630 |
| 7,826,220 B1* | 11/2010 | Baker | .................... | F41C 33/06 109/73 |
| 8,270,685 B2* | 9/2012 | Wu | ........................ | G06F 1/1616 341/20 |
| 8,598,981 B2* | 12/2013 | Idsoe | .............................. | 726/19 |
| 2002/0044675 A1* | 4/2002 | Chikazawa | ........ | G06K 9/00013 382/124 |
| 2005/0148217 A1* | 7/2005 | Takiar et al. | ................ | 439/76.1 |
| 2006/0115134 A1* | 6/2006 | Kozlay | ............. | G06K 9/00053 382/128 |
| 2007/0255961 A1* | 11/2007 | Tracy et al. | .................. | 713/186 |
| 2010/0201485 A1* | 8/2010 | Chou | ................. | G06K 9/00013 340/5.83 |
| 2012/0258773 A1* | 10/2012 | Alvarez Rivera et al. | ..... | 726/19 |

FOREIGN PATENT DOCUMENTS

EP    1083518 A2 *   3/2001    ......... G06K 19/0718

\* cited by examiner

*Primary Examiner* — Christopher Revak
*Assistant Examiner* — Vadim Savenkov
(74) *Attorney, Agent, or Firm* — Carol N. Green Kaul

(57) ABSTRACT

A mobile device comprising a touch screen display; at least one processor with computer executable instruction code executable by the at least one processor configured for detecting a finger gesture, heat or pressure exerted on the mobile device and for responding to the finger gesture, heat or pressure by activating a release mechanism for releasing biometric verification means to extend outward from the concealed housing positioned within the mobile device for user authorization for activating the mobile device with a valid biometric identifier, wherein upon activation the biometric verification means retracts into the concealed housing; and activating a verification module executable by the at least one processors configured for verifying an image of user's biometric identifier when the mobile device is in sleep mode or for communicating user's authorization to access at least one application program or a remote hardware device that requires biometric verification.

31 Claims, 8 Drawing Sheets

400

402 — Detecting By Computer Executable Instruction Code Of A Mobile Device's At Least One Processor, A Finger Gesture, Heat Or Pressure Exerted On A Mobile Device, Which Includes A Touch Screen Display, And For Responding To The Finger Gesture, Heat Or Pressure By Activating A Release Mechanism For Releasing Biometric Verification Means To Extend Outward From The Concealed Housing Positioned Within The Mobile Device For User Authorization For Activating The Mobile Device With A Valid Biometric Identifier, Wherein Upon Activation The Biometric Verification Means Retracts Into The Concealed Housing.

404 — Activating A Verification Module Executable By The At Least One Processor Configured For Verifying An Image Of User's Biometric Identifier When The Mobile Device Is In Sleep Mode Or For Communicating User's Authorization To Access At Least One Application Program Or A Remote Hardware Device That Requires Biometric Verification.

FIG. 4

APPARATUS, SYSTEM AND METHOD FOR AUTHENTICATING A PLURALITY OF USERS FOR A MOBILE DEVICE USING BIOMETRIC MEANS

PRIORITY CLAIM

This patent application is a non-provisional patent application and claims priority under 35 U.S.C. §119(e) to: U.S. Provisional Patent Application Ser. No. 61/587,239 titled Mobile Device With Biometric Authentication System Allowing For A Plurality Of Users, filed Jan. 17, 2012, which is hereby incorporated by reference as if fully stated herein.

FIELD OF THE INVENTION

The present disclosure relates generally to electronics systems and more specifically to an apparatus, system and method for authenticating a plurality of users of a mobile device using biometric means. Specifically, the present invention relates to a mobile device comprising of a touch screen display; at least one processor with computer executable instruction code executable by the at least one processor configured for detecting a finger gesture, heat or pressure exerted on the mobile device and for responding to the finger gesture, heat or pressure by activating a release mechanism for releasing biometric verification means to extend outward from the concealed housing positioned within the mobile device for user authorization for activating the mobile device with a valid biometric identifier, wherein upon activation the biometric verification means retracts into the concealed housing; and activating a verification module executable by the at least one processors configured for verifying an image of user's biometric identifier when the mobile device is in sleep mode or for communicating user's authorization to access at least one application program or a remote hardware device that requires biometric verification.

BACKGROUND OF THE INVENTION

Telephones have evolved over the years to become major sources of mobile telecommunications amongst the general public, and virtually everyone including young children either own one or more, or are able to operate them. Mobile telephones are used to make and receive calls internationally, transmit text messages, entertain via music, games, applications, or even surf the Internet. Because they are an invaluable part of our day to day existence and capable of use internationally once unlocked, theft of cellular phones are an issue. It is not uncommon that unlocked cellular phones are marketed abroad or users incur significant costs for unauthorized phone calls or other telecommunications. Thus, there needs to be an apparatus, system and method of preventing unauthorized users from obtaining access to the phone and its telecommunication service.

Doing business with mobile communication devices are extremely helpful as it is not geographically dependent and allows the parties to be located on opposite ends of continents and still be able to communicate, e.g. review documents, transfer information and the like. However, often time these transactions may only go so far and no more because validation of the identity of the transacting party is required in person. Thus, there needs to be a means, system or method of authenticating the identity of an individual in a seamless manner using mobile communication devices.

Accordingly, the various embodiments and disclosures described herein satisfies these long felt needs and solves the limitations of the prior art in a new and novel manner.

SUMMARY

An object of the present invention is to provide an apparatus, system and method for authenticating a plurality of users of a mobile device using biometric means.

Another objective of the present invention is to provide an apparatus, system and method which includes biometric verification means for authenticating the user's identity for various software application programs.

Another objective of the present invention is to provide an apparatus, system and method allowing for verification of a user's identity remotely for authentication of authority to share documents between a plurality of users.

Yet another objective of the present invention is to provide an apparatus, system and method whereby no network or Internet service provider can access a user's document folder on the CLOUD without the user approval through biometric verification.

The various embodiments of apparatus, systems and methods include a mobile device comprising of a touch screen display; at least one processor with computer executable instruction code executable by the at least one processor configured for performing any one or more of the following: detecting a finger gesture, heat or pressure exerted on the mobile device and for responding to the finger gesture, heat or pressure by activating a release mechanism for releasing biometric verification means to extend outward from the concealed housing positioned within the mobile device for user authorization for activating the mobile device with a valid biometric identifier, wherein upon activation the biometric verification means retracts into the concealed housing; and activating a verification module executable by the at least one processor configured for verifying an image of user's biometric identifier when the mobile device is in sleep mode or for communicating user's authorization to access at least one application program (mobile device or non-mobile device related application programs) or a remote hardware device that requires biometric verification; and the at least one application program or remote hardware device configured for receiving from the verification module, user's biometric identifier for authorizing access to the at least one application program or the remote hardware device.

The computer executable instruction code readable and executable by the at least one processor are further configured for performing any one or more of the following: activating the mobile device when powered off upon validation of the biometric identifier; activating the mobile device from sleep mode upon validation of the biometric identifier; executing the verification module for communicating user's biometric identifier to the at least one application program or remote hardware device; detecting a finger gesture, heat or pressure exerted on the touch screen display; or detecting a finger gesture, heat or pressure exerted on a push button connected to a portion of the push latch mechanism positioned within the mobile device. Release mechanism comprises of any kind of retain or release mechanism as are well known in the arts that include any one of the following: push latch, thermo-magnetic push latch, electromagnetic push latch, magnetic push latch, or spring-loaded lever.

Biometric verification means as used herein includes any one of the following: fingerprint recognition means, hand geometry recognition means, palm geometry recognition means, iris recognition means, retina recognition means, and speech recognition means and the like as are well known and used in the arts. In an exemplary embodiment, fingerprint recognition means includes a fingerprint scanner from which a biometric sample can be obtained and if valid stored as a biometric identifier on the mobile device's at least one memory means. Remote hardware device as used herein includes but is not limited to a remote control, timer, and door entry device and the like.

The at least one or more processors' computer executable instruction code readable and executable by the at least one processor are configured for performing any one or more of the following: activating the mobile device when powered off upon validation of the biometric identifier; activating the mobile device from sleep mode upon validation of the biometric identifier; or executing the verification module for communicating user's biometric identifier to the at least one application program or a remote hardware device.

Biometric verification means as used herein includes any one or more of the following: fingerprint recognition means, hand geometry recognition means, palm geometry recognition means, iris recognition means, retina recognition means, and speech recognition means. In an exemplary embodiment, fingerprint recognition means includes a fingerprint scanner.

Mobile device further comprises of at least one memory means for storing a biometric identifier. Remote hardware device as mentioned herein includes but is not limited to a remote control, timer, and door entry device.

In some embodiments of the invention, the invention further comprises of a system of authenticating a plurality of users comprising of: a mobile device that includes at least one or more processors with computer executable instruction code stored thereon readable and executable by the at least one processor; a touch screen display; a release mechanism in electronic communication with the touch screen display, wherein the release mechanism is configured for detecting a finger gesture, heat or pressure exerted on the touch screen display and for responding to the finger gesture, heat or pressure by releasing biometric verification means to extend outward from the concealed housing positioned within the mobile device for user authorization for activating the mobile device with a valid biometric identifier, wherein upon activation the biometric verification means retracts into the concealed housing; and at least one application program or a remote hardware device requiring biometric verification, in communication with a verification module, executable by the mobile device's at least one or more processors, for verifying an image of user's biometric identifier when the mobile device is in sleep mode and for communicating user's authorization to access the at least one application program or remote hardware device.

Processors' computer executable instruction code readable and executable by the at least one processor are configured for performing any one or more of the following: activating the mobile device when powered off upon validation of the biometric identifier; activating the mobile device from sleep mode upon validation of the biometric identifier; or executing the verification module for communicating user's biometric identifier to the at least one application program or a remote hardware device.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

FIG. 4 is a sample flowchart of block diagram of an exemplary method according to one embodiment of the invention.

DETAILED DESCRIPTION OF PREFERRED EMBODIMENTS

Figure 1A:
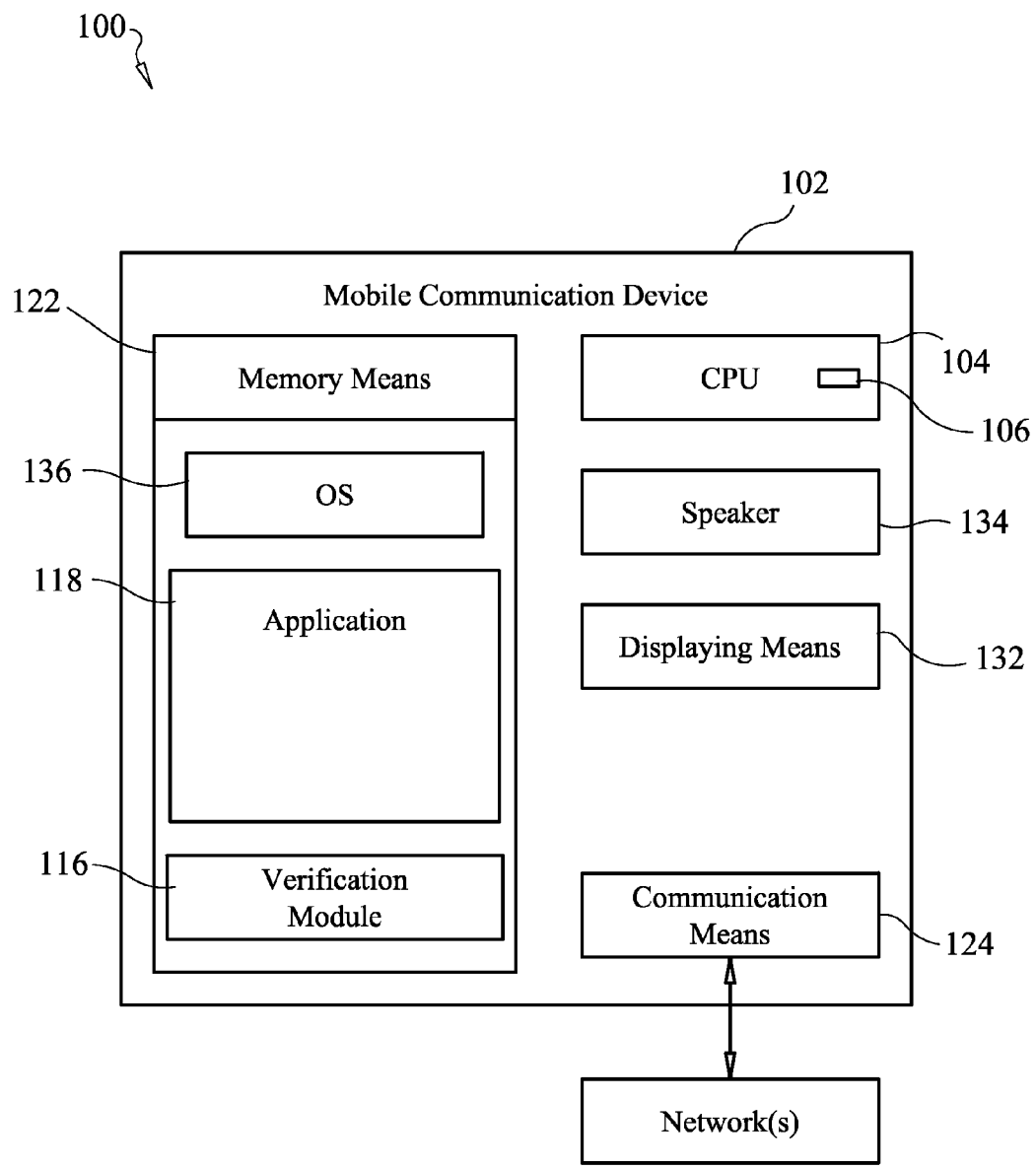
FIG. 1A shows a mobile device in accordance with one embodiment of the invention.

Reference will now be made in detail to embodiments, examples of which are illustrated in the accompanying drawings. In the following description, numerous specific details are set forth in order to provide a thorough understanding of the invention. However, this discussion should not be construed, as limiting the invention to those particular embodiments, as practitioners skilled in the art will appreciate that a system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. In other instances, well-known methods, procedures, components, circuits, and networks have not been described in detail so as not to unnecessarily obscure aspects of the embodiments. However, it will be apparent to one skilled in the art that the invention may be practiced without these specific details. Turning now descriptively to the drawings, in which similar reference characters denote similar elements throughout the several views.

Apparatus & System Overview

FIG. 1A is an exemplary view of the mobile device 100 according to one embodiment of the present invention.

Mobile device 100 comprises of at least a touch screen display 102; at least one or more computer processors 104, 104' with computer executable instruction code 106 stored thereon, readable and executable by the at least one or more processors 104, 104' configured for performing any one or more of the following: detecting a finger gesture, heat or pressure exerted on the mobile device 100, e.g. its touch screen display 102, and for responding to the finger gesture, heat or pressure by activating a retain or release mechanism 108 (hereinafter "release mechanism") for releasing biometric verification means 110 to extend outward from the concealed housing 112 positioned within the mobile device 100 for user authorization for activating the mobile device 100 with a valid biometric identifier, 114 wherein upon activation the biometric verification means 110 retracts into the concealed housing 112; and activating a verification module 116 executable by the at least one or more processors 102, 102' configured for verifying an image of user's biometric identifier 114 when the mobile device 100 is in sleep mode or for communicating user's authorization to access at least one software application program 118 or a remote hardware device 120 that requires biometric verification.

Mobile device 100 may be any type of device configured with means for communicating wirelessly and/or wired with other mobile devices 100', 100", such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

Mobile device 100 may include various hardware components, e.g. a central processor 104, memory means 122, and one or more communication means 124. Central processor 104 may be any type of computer processor, such as, but not limited to, a central processing unit (CPU), a microprocessor, a video processor, a front end processor, a coprocessor, a single-core central processor, a multi-core processor, and the like. Central processor 104 may be programmed for detecting a finger gesture, heat or pressure exerted on for example the mobile device's touch screen display 102 and for responding to the finger gesture, heat or pressure by activating a release mechanism 108 for releasing biometric verification means 110 to extend outward from the concealed housing 112 positioned within the mobile device 100 for user authorization for activating the mobile device 100 with a valid biometric identifier 114, wherein upon activation the biometric verification means 110 retracts into the concealed housing 112; and activating a verification module 116 executable by the at least one or more processors 102, 102' configured for verifying an image of user's biometric identifier 114 when the mobile device 100 is in sleep mode or for communicating user's authorization to access at least one application program 118 or a remote hardware device 120 that requires biometric verification; activating the mobile device 102 when powered off upon validation of the biometric identifier 114; activating the mobile device 102 from sleep mode upon validation of the biometric identifier 114; executing the verification module 116 for communicating user's biometric identifier 114 to the at least one or more software application program 118, 118' that comprises of mobile device application programs 118, 118' or non-mobile device application programs 118, 118' as well as remote hardware device 120; detecting a finger gesture, heat or pressure exerted on the touch screen display 102, for example on an icon 126 as displayed on the touch screen display 102; or detecting a finger gesture, heat or pressure exerted on a push button 128 connected to that portion of the release mechanism 108, i.e. the exemplary push latch mechanism, positioned within the mobile device 100.

Displaying means 132, including, but is not limited to, an electronic display device, such as a liquid crystal display, a plasma display, or a light emitting diode display. In the exemplary embodiment, mobile device 100 respectively comprises of a touch-screen display 102. In yet further embodiments, mobile device 100 may also include control means, such as, but not limited to, a touch screen, a stylus, and the like.

In some embodiments, mobile device 100 also includes a speaker 134 as is well known and used in the arts for broadcasting audio concerning user's authorization based on the verification or nor-verification of the biometric identifier 114.

Mobile device also includes communication means 124 that is either electrically or mechanically connected to central processor 104, where in the case of electronic connections, the electronic connections may be wired and/or wireless. In some embodiments, communication means 124 may be a wireless or wired communication means 124, which employ short range wireless protocol, such as, but not limited to, a radio frequency transceiver, a radio frequency receiver, and/or a radio frequency transmitter. In embodiments where the wireless communication means 124 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, communication means 124 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 124 are operative to transmit or receive electronic communications, i.e. data, text, pictures, and the like via a short range wireless protocol, such as, but not limited to, a radio frequency receiver, a radio frequency transmitter, or a radio frequency transceiver over a local communications network or wide area communications network.

In yet another embodiment, communication means 124 are operative for accessing a cellular network, such as a GSM network, a data network, such as local communications network, or a wide area communications network, such as the Internet or a world wide web. In yet another embodiment, the at least one communication means 124 comprises a communication means 124 for accessing a web-enabled device, such as a Bluetooth module for accessing a web-enabled smartphone. Signals generated by communication means 124 are one example of communication media. Communication media may typically include computer executable instruction code 106, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Central processor 104 includes computer executable instruction code 106, where the computer executable instruction code 106 are operative to perform all the necessary functions for the system 100 and methods disclosed herein. In exemplary embodiments, computer executable instruction code 106 may be loaded directly on the mobile device's central processor 104 as shown in FIG. 1A, or may be stored in its memory means 122. Computer executable instruction code 106 may be any type of computer executable instruction code 106, which may be in the form of a computer program, the program being composed in any suitable programming language or source code, such as C++, C, JAVA, JavaScript, HTML, XML, and other programming languages.

Memory means 122 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile device 100. Memory means 122 may store other software components e.g. an operating system 136 and an application program 118' that manages the varied software application programs 118, 118" that run on the mobile device 100.

Application program 118' may be any type of software application program or module comprising of computer executable instruction code 106 and may comprise in part of a browser, such as for use on the mobile device 100, or a similar browsing device. Application program 118' that resides on the mobile device 100 manages other applications 118, 118" (mobile and non-mobile related) that are executable on the mobile device 100. Application program 118' may be operative for an iPhone, any other "smart phone", mobile device, cellular phone, PDA, GPS or any other mobile device 102 capable of handling transactions dealing with dynamic content, object, application, or software and may include mobile device related software application programs 118, 118" or non-mobile related software application programs 118, 118". The application programs 118, 118" that use the biometric identifier 114 as obtained from the biometric verification means 110 may be a standalone application 118, 118" designed to run on a mobile platform, such as a mobile device running its operating system 136, such as iOS™, Android™, Windows Mobile™, Blackberry™, and the like that are well known and used in the arts or may include non-mobile related applications 118, 118" that may be for instance linked to a remote hardware device 120.

Prior to the mobile device 100 being used, a biometric sample is obtained and enrolled as a biometric identifier 114 for each authorized user of the mobile device 102, which is stored on the mobile device's memory means 122 for future reference and comparison. Biometric identifier 114 as used herein describes a biometric sample that uniquely identifies the authorized user based on his/her intrinsic physical traits, e.g. fingerprints, retina scan, palm geometry, hand geometry, speech, and or other biometric identifiers 114, 114' that are used in the arts.

Biometric verification means 110 positioned thereon is configured for validating an authorized user's unique biometric sample by comparing the biometric sample with the biometric identifier 114 stored on the mobile device's memory means 122. Biometric verification means 110 includes but is not limited to: fingerprint recognition means, hand geometry recognition means, palm geometry recognition means, iris recognition means, retina recognition means, speech recognition means and any other biometric verification means 110 that are known and used in the arts. In some embodiments, biometric verification means 110 includes at least one processor 104' in communication with the mobile device's at least one or more processors 104, 104' to control the scanner and operability of the biometric verification means 110. In the exemplary embodiment, the mobile device's at least one or more processors 104, 104' control the biometric verification means 110, which is in communication with for example, a fingerprint scanner, hand geometry scanner, a palm geometry scanner, iris scanner, retina scanner, or a program which includes an audio receiving circuit capable of receiving audio signals at predetermined frequencies and/or with additional hardware complete with electronic circuitry and/or such other biometric verification means 110 that are known and used in the arts.

Illustratively, as seen in FIG. 1A, the biometric verification means 110 includes a fingerprint scanner, which in the retracted position is housed in the concealed housing 112 within the mobile device 100, when the mobile device 100 is off or in sleep mode. It is understood that the concealed housing 112 is configured in size and dimension to accommodate the respective biometric scanner, for example the exemplary fingerprint scanner as shown in FIG. 1A. The mobile device's at least one or more processors 104, 104' control the functionality of the fingerprint scanner, generating the varied algorithms for storage of the initial valid biometric samples for the authorized users as biometric identifiers 114, 114' and validate the images of subsequent biometric samples received from the mobile device's users.

Biometric verification means 110 is activated by touch screen technology that is well known and used in the arts. In an exemplary embodiment, by placing a finger on the mobile device's touch screen display 102, for example on an icon 126 as displayed on the touch screen display 102, the mobile device's at least one or more processors' computer executable instruction code 106, 106' are configured for detecting the finger gesture, heat or pressure exerted on the icon 126 and respond by activating the release mechanism 108 to release the exemplary fingerprint scanner to extend outward from the concealed housing 112 positioned within the mobile device 102 for user authorization by activating the mobile device 102 with a valid biometric identifier 114. User may authenticate his/her fingerprint to activate the mobile device's 100, e.g. power on the mobile device 100 or terminate sleep mode and activate for use. As such, in the event the mobile device 100 is lost, an unauthorized finder cannot use the phone as his/her biometric sample, e.g. fingerprint, will not match the at least one or more authorized biometric identifiers 114, 114' stored thereon. Thus, the mobile device 102 provides an added level of security as a result of the biometric verification means 110 positioned within. Icon 126 as used herein is a graphic image, a small picture or object representative of an application program 118, web page, or command for execution of program modules comprising of computer executable instruction code 106 that the mobile device's at least one or more processors 104, 104' use inter alia to control the release mechanism 108.

Figure 1B:
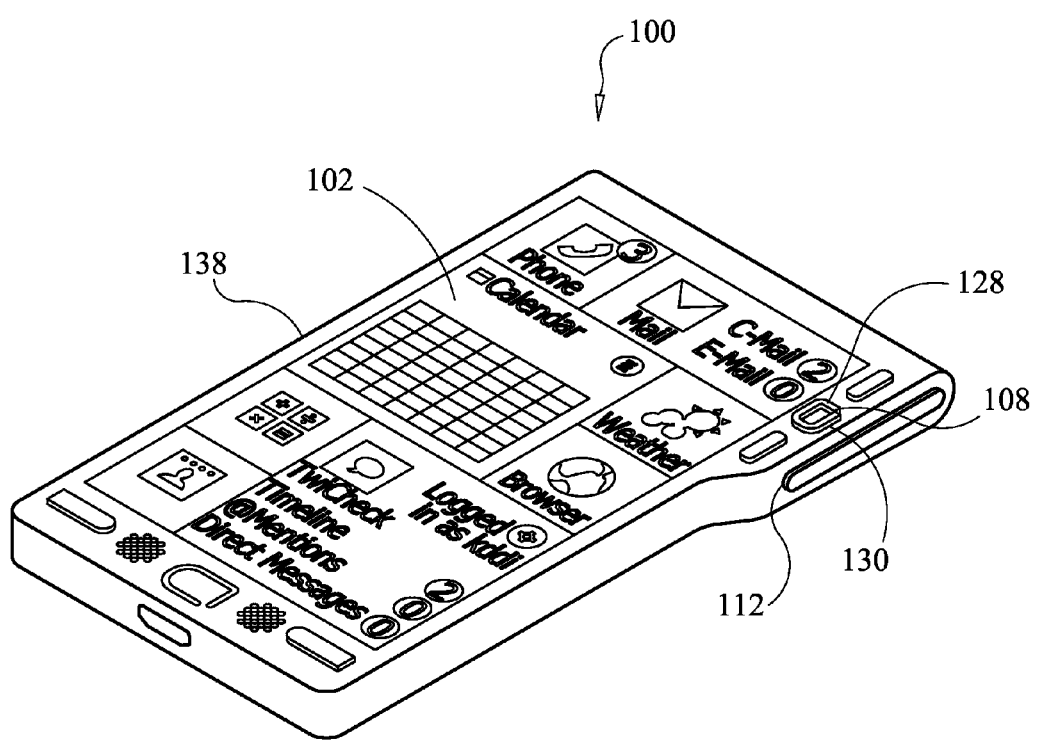
FIG. 1B shows an exemplary embodiment of the mobile device of the invention.

Release mechanism 108 includes but is not limited to retain or release mechanisms that are well known and used in the arts to retain or release an object and may include any one of the following push latch, thermo-magnetic push latch, electromagnetic push latch, magnetic push latch, spring-loaded levers, and the like. As shown in FIG. 1B, in an exemplary embodiment the release mechanism 108 includes a push button 128 positioned on the mobile device's exterior 138 calibrated to detect finger gesture, heat or pressure when depressed such that in response to the detected finger gesture, heat or pressure it engages that portion of a push latch mechanism positioned within the mobile device 100 to release the biometric verification means 110 from the concealed housing 112 to extend outward for user authorization. Once the mobile device 100 is activated, the biometric verification means 110 retracts into the concealed housing 112 and is retained by the release mechanism 108. Further verifications of any biometric identifiers 114, 114' for example when the mobile device 100 is in sleep mode, is conducted by the verification module 116 which comprises of computer executable instruction code 106 executable by the at least one or more processors 104, 104" verifying the proposed user's biometric sample with an image of the one or more biometric identifiers 114, 114' stored on the mobile device 100. Verification module 116 acts as an interface between the mobile device 100 and application programs 118, 118', including but not limited to mobile device and non-mobile device application programs 118, 118', as the verification module 116 communicates user's authorization to access the at least one or more application programs 118, 118' or a remote hardware device 120 that requires biometric verification. Remote hardware device 120 as mentioned herein includes but is not limited to a remote control, timer, door entry device and the like.

Figure 2A:
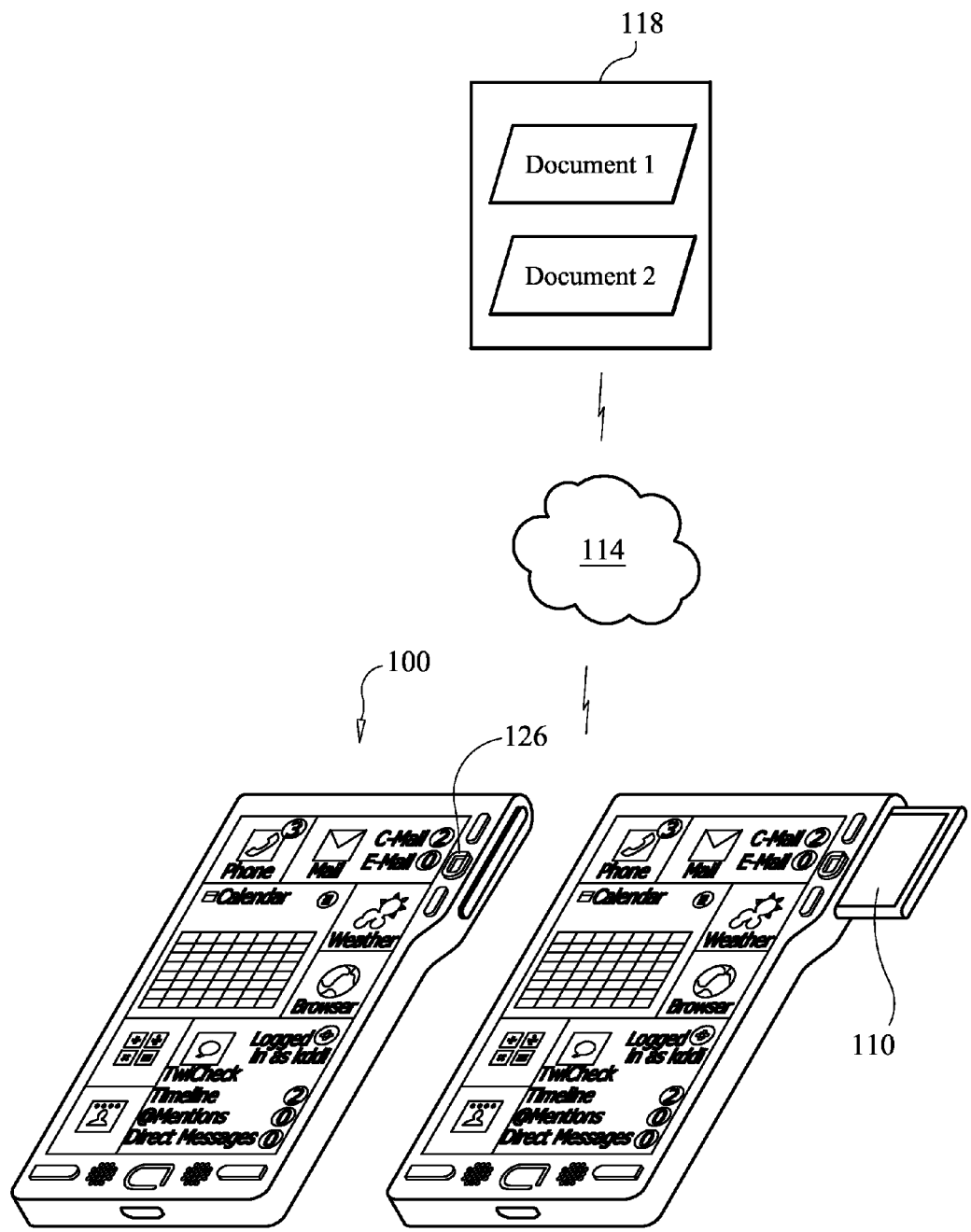
FIG. 2A shows an exemplary embodiment of the system of the invention.

FIG. 2A shows an exemplary system 200 according to one embodiment of the invention. System 200 of authenticating a plurality of users comprises of the mobile device 100, which includes at least a touch screen display 102; at least one or more processors 104, 104' with computer executable instruction code 106 stored thereon readable and executable by the at least or more processors 104, 104' configured for performing any one or more of the following: detecting a finger gesture, heat or pressure exerted on the mobile device 100, e.g. on an icon 126 as displayed on the touch screen display 102 or the release mechanism 108, and for responding to the finger gesture, heat or pressure by activating the release mechanism 108 for releasing biometric verification means 110 to extend outward from the concealed housing 112 positioned within the mobile device 100 for user authorization for activating the mobile device 100 with a valid biometric identifier, 114 wherein upon activation the biometric verification means 110 retracts into the concealed housing 112; and activating a verification module 116 executable by the at least one or more processors 102, 102' configured for verifying an image of user's biometric identifier 114 when the mobile device 100 is in sleep mode or for communicating user's authorization to access at least one software application program 118 or a remote hardware device 120 that requires biometric verification; and the at least one application program 118 or remote hardware device 120 configured for receiving from the verification module 116, user's biometric identifier 114 for authorizing access to the at least one application program 118 (mobile device related or non-mobile device related) or the remote hardware device 120.

The mobile device's computer executable instruction code 106 executable by the at least or more processors 104, 104' is further configured for activating the mobile device 104' when powered off upon validation of the biometric identifier 114; activating the mobile device 102 from sleep mode upon validation of the biometric identifier 114; executing the verification module 116 for communicating user's biometric identifier 114 to the at least one application program 118 or remote hardware device 120; detecting a finger gesture, heat or pressure exerted on the touch screen display 102; or detecting a finger gesture, heat or pressure exerted on a push button 128 connected to a portion of the exemplary push latch 130 of the release mechanism 108 positioned within the mobile device 100.

Figure 2B:
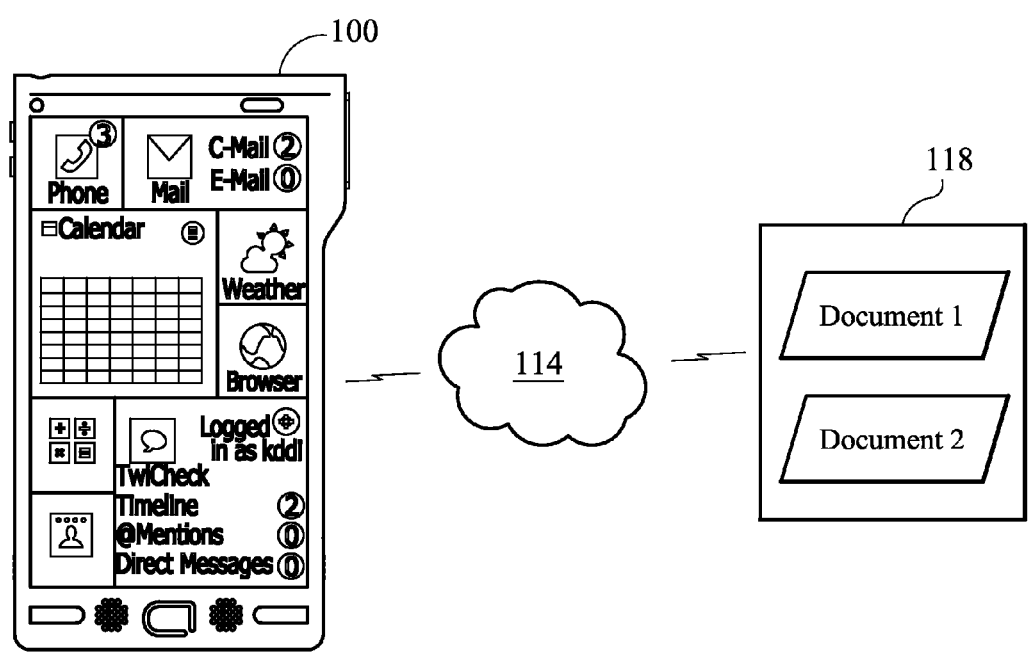
FIG. 2B shows an exemplary embodiment of the system of the invention.

Mobile device's biometric verification means 110 allow a biometric sample from any one of the plurality of users to be validated for any software application program 118 accessible on the mobile device 102 or on a remote hardware device 120 that requires biometric verification. In an exemplary embodiment as seen in FIG. 2B, the user's biometric sample is required to authenticate the user's access to a software application program 118, e.g. documents located on the CLOUD. Because the mobile device 102 includes biometric verification means 110, the biometric sample obtained using the mobile device's biometric verification means 110 may also be used to authenticate the user's authority to access a software application program 118, i.e. the CLOUD, and any documents such authority confers.

Figure 2C:
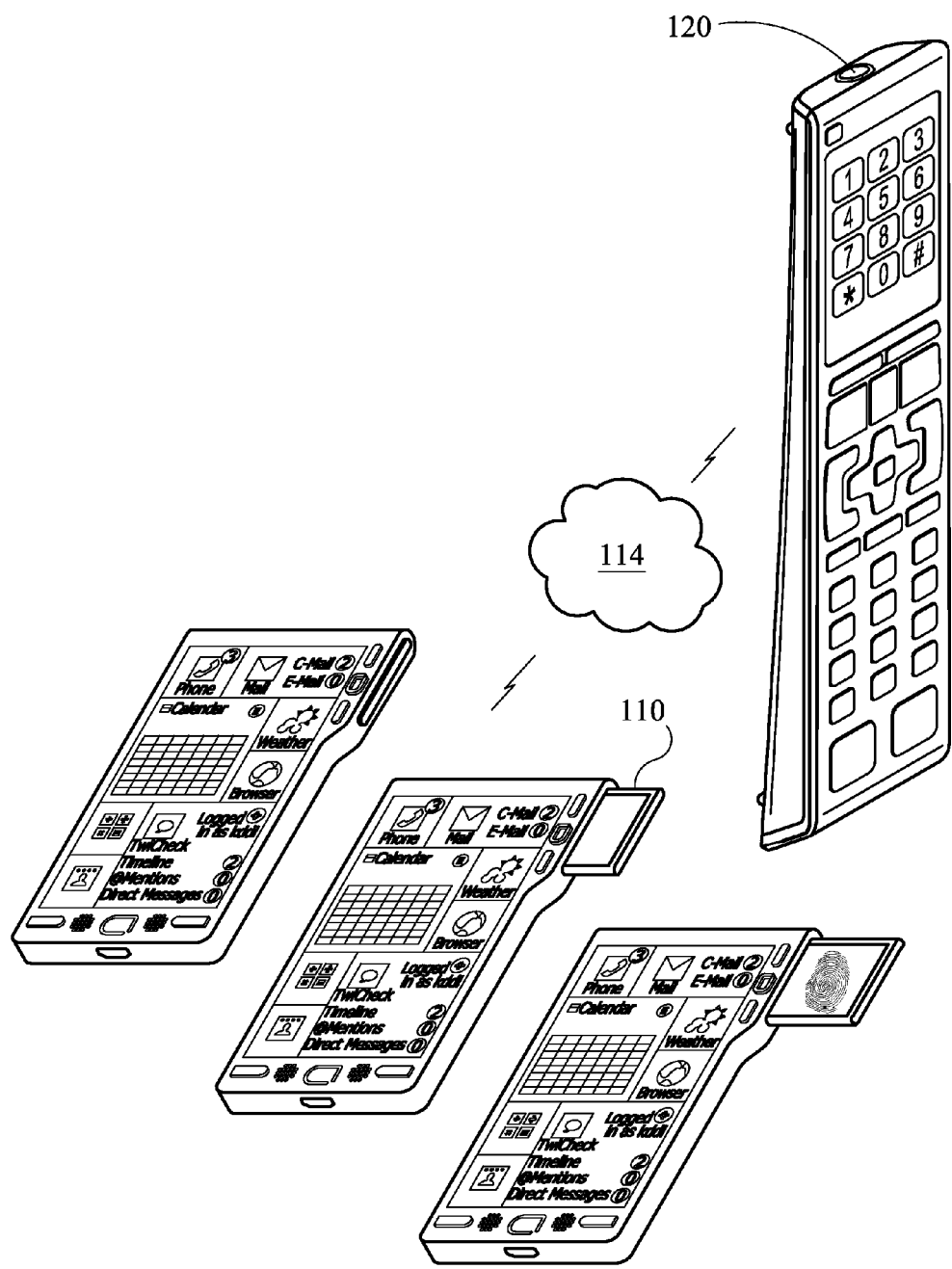
FIG. 2C shows an exemplary system according to one embodiment of the invention.

In another exemplary embodiment as seen in FIG. 2C, the sample application program 118 references a media delivery system, "ATOMS BARCHAN MST ANDROID 5.0 to 6.0, which generally requires biometric verification on a remote hardware device 120 in order to allow access to pay per view or on demand media delivery to be streamed to a communication device. The media delivery system may include software components that may be accessible to the mobile device 100 via for example a software application program 118 that may or may not reside on the mobile device that controls the hardware components of the media delivery system. In this embodiment, the biometric sample obtained via the mobile device's biometric verification means 110 can be made available to the software application program 118 to authenticate the user's access to the hardware device 120, i.e. the media delivery system prior to the streamed content being authorized for streaming. In some embodiments, software application programs 118, 118' 118" (mobile and non-mobile related) may be stored locally, in whole or in part, such as in or on the mobile device 102. In other embodiments, software application programs 118, 118' 118" may be stored remotely, in whole or in part, such as in a central station, which may include a server. The central station may belong to mobile communications service operator, such as cellular telephone/data service provider. The local software application programs 118, 118' 118" may take the form of a downloadable mobile application program 118. In yet another embodiment, the local software application programs 118, 118' 118" may respectively comprise a voice over internet protocol (VoIP) software application.

In some embodiments, wide area communications network may comprise of a world-wide-web or the internet. Communications networks 136 may respectively comprise a Wi-Fi network supplied by a WiFi or other wireless network router, which may be connected to wide area communications network via a modem, such as a cable modem, a satellite modem, a GSM modem, a DSL modem, and the like. Accordingly, local communications networks 136 may respectively be connected to wide area network.

In yet another embodiment, mobile device 102 may respectively be operative to send or receive communications, such as voice, text, audio-visual, or data communications by connecting respectively to local wireless communications networks, accessing wide area network via local wireless communications network, and using said series of interconnected local and wide area communications networks to communicate with each other, such as by transmitting and receiving voice, image, video, audio, or data communications.

Methods

Figure 3:
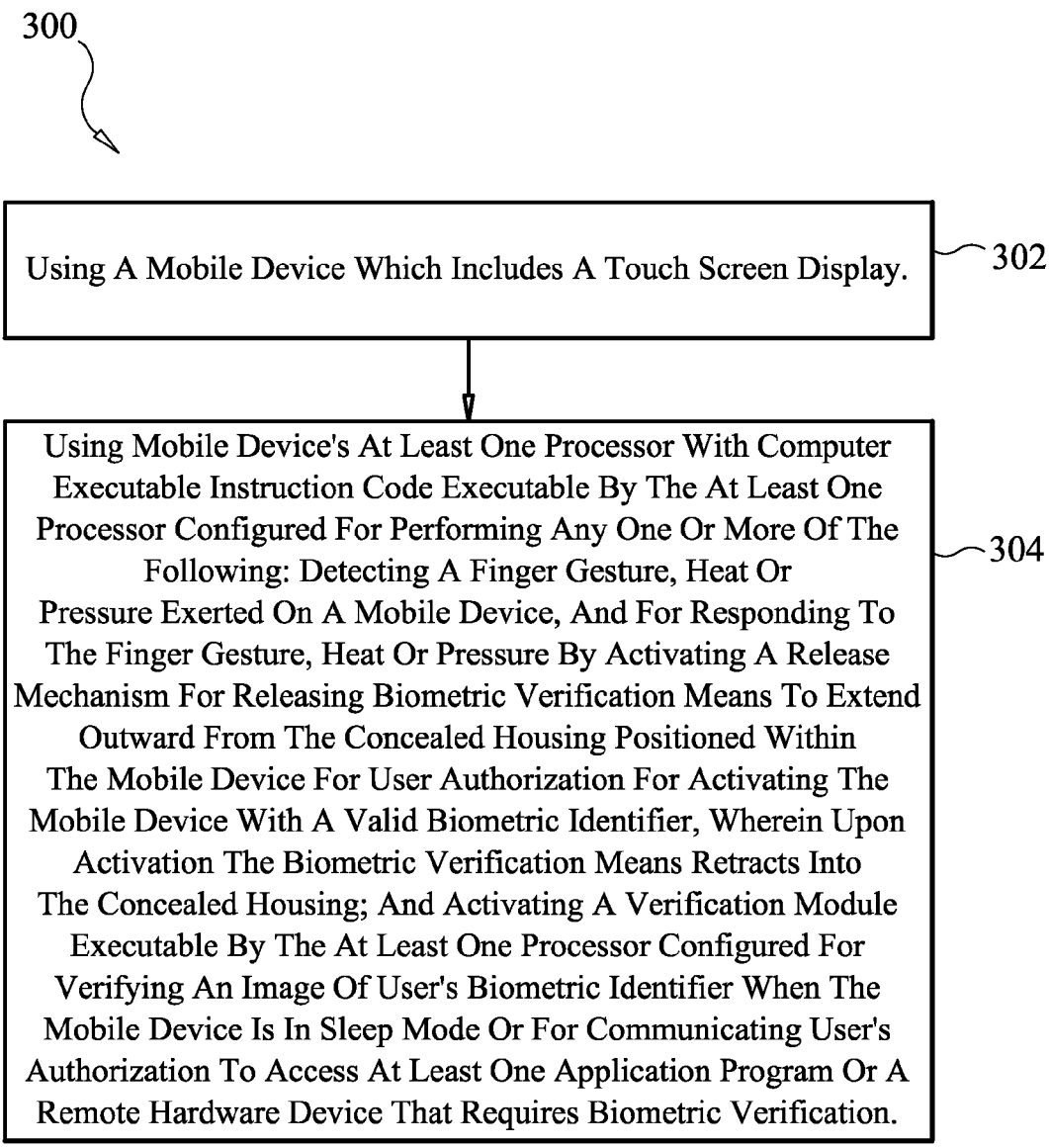
FIG. 3 is a sample flowchart of block diagram of an exemplary method according to one embodiment of the invention.

FIG. 3 is a sample flowchart of block diagram of an exemplary method 300 according to one embodiment of the invention. Method 300 comprises of using a mobile device 100, which includes a touch screen display (step 302).

Mobile device 300 comprises of the mobile device 100 as previously described herein in conjunction with the description of the apparatus and system overview. Mobile device 300 may be any type of device configured with means for communicating wirelessly and/or wired with other mobile devices 100', 100", such as but not limited to, cellular phones, location-aware portable phones (such as GPS), a personal computer, server computer, or laptop or netbook computer, PDA such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

Method 300 further comprises of using mobile device's at least one or more processors 104, 104' with computer executable instruction code 106 executable by the at least one or more processors 104, 104' configured for performing any one or more of the following: detecting a finger gesture, heat or pressure exerted on the mobile device 100, e.g. its touch screen display 102, and for responding to the finger gesture, heat or pressure by activating the release mechanism 108 for releasing the biometric verification means 110 to extend outward from the concealed housing 112 positioned within the mobile device 100 for user authorization for activating the mobile device 100 with a valid biometric identifier, 114 wherein upon activation the biometric verification means 110 retracts into the concealed housing 112; and activating a verification module 116 executable by the at least one or more processors 102, 102' configured for verifying an image of user's biometric identifier 114 when the mobile device is in sleep mode or for communicating user's authorization to access at least one software application program 118 or a remote hardware device 120 that requires biometric verification (step 304). Release mechanism 108 includes but is not limited to retain or release mechanisms that are well known and used in the arts to retain or release an object and may include any one of the following push latch, thermo-magnetic push latch, electro-magnetic push latch, magnetic push latch, spring-loaded levers, and the like.

Computer executable instruction code 106 executable by the at least one or more processors 104, 104' is further configured for performing any one or more of the following: activating the mobile device 100 when powered off upon validation of the biometric identifier 114; activating the mobile device 100 from sleep mode upon validation of the biometric identifier 114; or executing the verification module 116 for communicating user's biometric identifier 114 to the at least one application program 118 or remote hardware device 120; detecting a finger gesture, heat or pressure exerted on the touch screen display 120, e.g. an icon 126 as displayed on the touch screen display 120; or detecting a finger gesture, heat or pressure exerted on a push button 128 connected to a portion of the push latch mechanism 130 which is a part of the release mechanism 108 that is positioned within the mobile device 100. Remote hardware device 120 as mentioned herein includes but is not limited to a remote control, timer, door entry device and the like.

Biometric verification means 110 includes but is not limited to: fingerprint recognition means, hand geometry recognition means, palm geometry recognition means, iris recognition means, retina recognition means, speech recognition means and any other biometric verification means 110 that are known and used in the arts. In some embodiments, biometric verification means 110 includes at least one processor 104' in communication with the mobile device's at least one or more processors 104, 104' to control the biometric scanner and operability of the biometric verification means 110. In an exemplary embodiment, the mobile device's at least one or more processors 104, 104' control the biometric verification means 110, which is in communication with for example, a fingerprint scanner, hand geometry scanner, a palm geometry scanner, iris scanner, retina scanner, or a program which includes an audio receiving circuit capable of receiving audio signals at predetermined frequencies and/or with additional hardware complete with electronic circuitry and such other biometric verification means 110 that are known and used in the arts.

In an exemplary embodiment, biometric verification means 110 includes a fingerprint recognition means which include a fingerprint scanner, which in the retracted position is housed in the concealed housing 112 within the mobile device 100, when the mobile device 100 is off or in sleep mode. The mobile device's at least one or more processors 104, 104' control the functionality of the biometric verification means 110, generating the varied algorithms for storage of the initial valid biometric samples for the authorized users as biometric identifiers 114, 114' and validate the images of subsequent biometric samples received from the mobile device's users. The biometric identifiers 114, 114' for all authorized users are stored on the mobile device's memory means 122 for later verification of an image of an authorized user's biometric identifier 114 by the verification module 116 that is executable by the at least one or more processors 102, 102'. Verification module 116 is configured for verifying the image of user's biometric identifier 114 when the mobile device 100 is in sleep mode or for communicating user's authorization to access at least one software application program 118 or a remote hardware device 120 that requires biometric verification FIG. 4 is a sample flowchart of block diagram of an exemplary method 400 according to one embodiment of the invention. Method 400 comprises of detecting by computer executable instruction code 106 of a mobile device's at least one or more processors 104, 104', a finger gesture, heat or pressure exerted on the mobile device 100, which includes a touch screen display 102, and for responding to the finger gesture, heat or pressure by activating a release mechanism 108 for releasing biometric verification means 110 to extend outward from the concealed housing 112 positioned within the mobile device 100 for user authorization for activating the mobile device 100 with a valid biometric identifier 114, wherein upon activation the biometric verification means 110 retracts into the concealed housing 112 (step 402).

Method 400 further comprises of activating a verification module 116 executable by the at least one or more processors 104, 104' configured for verifying an image of user's biometric identifier 114 when the mobile device 100 is in sleep mode or for communicating user's authorization to access at least one software (mobile device and non-mobile device) application program 118 or a remote hardware device 120 that requires biometric verification (step 404).

Method 400 further comprises of the mobile device's processor's computer executable instruction code 106 being further configured for detecting a finger gesture, heat or pressure exerted on any one of the following: the touch screen display 102 or a push button 128 connected to a portion of the push latch mechanism 130 of the release mechanism 108 positioned within the mobile device 100. As previously mentioned, a potential user may exert heat or pressure or use a finger gesture on an icon 126 causing the release mechanism 108 to release the biometric verification means 110.

Method 400 further comprises of the mobile device's processor's computer executable instruction code 106 being further configured for activating the mobile device 100 upon validation of the biometric identifier 114 from any one of the following: off or sleep mode; executing the verification module 116 for communicating user's biometric identifier 114 to the at least one application program 118 or remote hardware device 120.

The various systems and methods described herein may be used to facilitate a user by allowing them to connect their domestic communications device to a home base, and connect to that domestic communications device using an international communications device over a global communications network.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the system 100 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
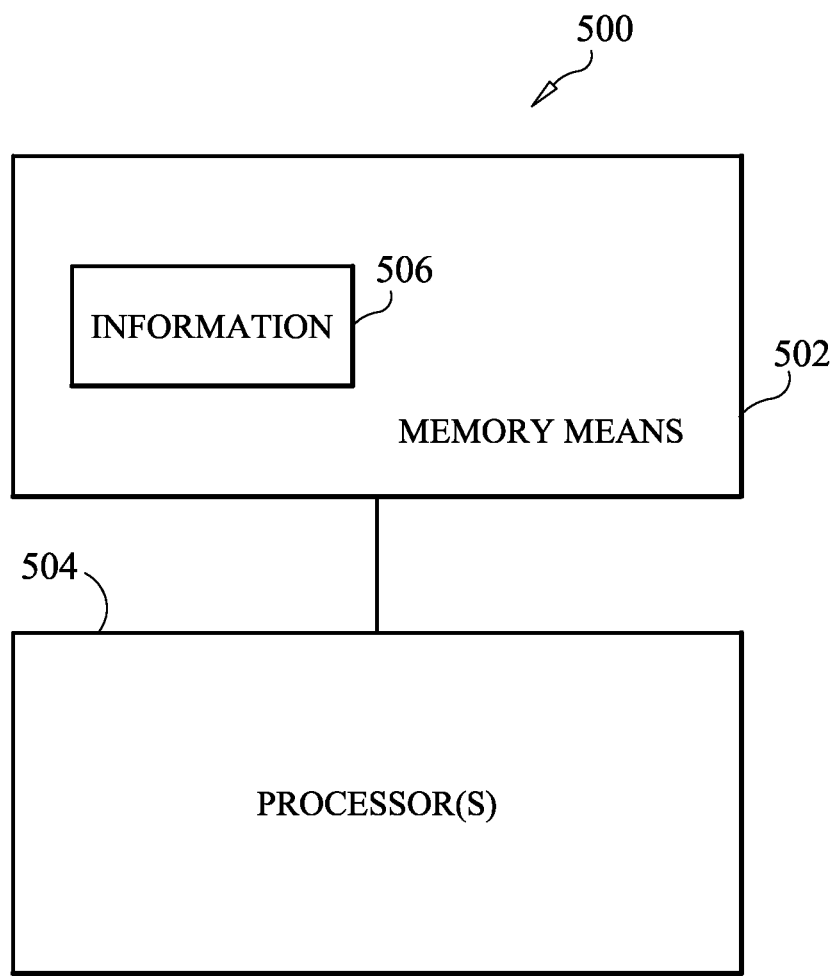
FIG. 5 is a block diagram representing an apparatus 500 according to various embodiments.

FIG. 5 is a block diagram representing an apparatus 500 according to various embodiments. Such embodiments may comprise a computer, a memory system, a magnetic or optical disk, some other storage device, or any type of electronic device or system. The apparatus 500 may include one or more processor(s) 504 coupled to a machine-accessible medium such as a memory 502 (e.g., a memory including electrical, optical, or electromagnetic elements). The medium may contain associated information 506 (e.g., computer program instruction code, data, or both) which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A mobile device comprising:
a touch screen display;
at least one processor positioned within the mobile device, with computer executable instruction code executable by the at least one processor enabled for performing the following:
detecting a finger gesture, heat or pressure exerted on the mobile device's touch screen display when the mobile device is in sleep mode or otherwise inactive, and responsive to the detected finger gesture, heat or pressure, activating a mechanical release mechanism positioned within the mobile device for releasing a retractable mechanical biometric verification means to extend outward from a concealed housing positioned within the mobile device for user authorization for activating the mobile device with a valid biometric identifier, wherein upon activation the biometric verification means retracts into the mobile device's concealed housing; and
activating a verification module executable by the at least one processor enabled for verifying an image of user's biometric identifier to enable activating or initializing the mobile device for use.

2. The mobile device of claim 1, wherein the computer executable instruction code readable and executable by the at least one processor are further configured for performing any one or more of the following:
activating the mobile device when powered off upon validation of the biometric identifier;
activating the mobile device from sleep mode upon validation of the biometric identifier;
executing the verification module for communicating user's biometric identifier to the at least one application program or remote hardware device for enabling access to the application program or remote hardware; or
detecting a finger gesture, heat or pressure exerted on a push button connected to a portion of the push latch mechanism positioned within the mobile device.

3. The mobile device of claim 1, wherein the biometric verification means includes at least one processor in communication with any one of the following: fingerprint recognition means, hand geometry recognition means, palm geometry recognition means, iris recognition means, retina recognition means, and speech recognition means.

4. The mobile device of claim 3, wherein said fingerprint recognition means includes a fingerprint scanner.

5. The mobile device of claim 1, further comprising at least one memory means for storing the biometric identifier.

6. The mobile device of claim 1, wherein the remote hardware device includes but is not limited to a remote control, timer, and door entry device.

7. The mobile device of claim 1, wherein the release mechanism comprises of any one of the following: push latch, thermo-magnetic push latch, electromagnetic push latch, magnetic push latch, or spring-loaded lever.

8. A system of authenticating a plurality of users comprising of:
mobile device that includes a touch screen display and at least one processor positioned within the mobile device, with computer executable instruction code executable by the at least one processor enabled for performing the following:
detecting a finger gesture, heat or pressure exerted on the mobile device's touch screen display when the mobile device is in sleep mode or otherwise inactive, and responsive to the detected finger gesture, heat or pressure, activating a mechanical release mechanism positioned within the mobile device for releasing a retractable mechanical biometric verification means to extend outward from a concealed housing positioned within the mobile device for user authorization for activating the mobile device with a valid biometric identifier, wherein upon activation the biometric verification means retracts into the mobile device's concealed housing; and
activating a verification module executable by the at least one processor enabled for verifying an image of user's biometric identifier to enable activating or initializing the mobile device for use.

9. The system of claim 8, wherein the at least one processors' computer executable instruction code readable and executable by the at least one processor are configured for performing any one or more of the following:
activating the mobile device when powered off upon validation of the biometric identifier;
activating the mobile device from sleep mode upon validation of the biometric identifier;
executing the verification module for communicating user's biometric identifier to the at least one application program or remote hardware device for enabling access to the application program or remote hardware; or
detecting a finger gesture, heat or pressure exerted on a push button connected to a portion of the push latch mechanism positioned within the mobile device.

10. The system of claim 8, wherein the biometric verification means includes at least one processor in communication with any one of the following: fingerprint recognition means, hand geometry recognition means, palm geometry recognition means, iris recognition means, retina recognition means, and speech recognition means.

11. The system of claim 10, wherein said fingerprint recognition means includes a fingerprint scanner.

12. The system of claim 8, further comprising at least one memory means for storing the biometric identifier.

13. The system of claim 8, wherein the remote hardware device includes but is not limited to any one of the following: a remote control, timer, and door entry device.

14. The system of claim 8, wherein the release mechanism comprises of any one of the following: push latch, thermo-magnetic push latch, electromagnetic push latch, magnetic push latch, or spring-loaded lever.

15. The system of claim 8 further comprising at least one application program or remote hardware device configured for receiving from the verification module, user's biometric identifier for authorizing access to the at least one application program or the remote hardware device.

16. A method comprising:
using at least one processor's that comprises computer executable instruction code readable and executable by the at least one processor, which when executed causes the at least one processor for performing any one or more of the following:
detecting a finger gesture, heat or pressure exerted on a touch screen display of a mobile device when the mobile device is in sleep mode or otherwise inactive, and for using at least one processor positioned within the mobile device, with computer executable instruction code executable by the at least one processor enabled for responding to the detected finger gesture, heat or pressure by activating a mechanical release mechanism positioned within the mobile device for releasing a retractable mechanical biometric verification means to extend outward from a concealed housing positioned within the mobile device for user authorization for activating the mobile device with a valid biometric identifier, wherein upon activation the biometric verification means retracts into the concealed housing; and
activating a verification module executable by the at least one processor configured for verifying an image of user's biometric identifier to enable activating or initializing the mobile device for use.

17. The method of claim 16, wherein the at least one processor's computer executable instruction code readable and executable by the at least one processor is further configured for performing any one or more of the following:
activating the mobile device when powered off upon validation of the biometric identifier;
activating the mobile device from sleep mode upon validation of the biometric identifier; or
executing the verification module for communicating user's biometric identifier to the at least one application program or remote hardware device; or
detecting a finger gesture, heat or pressure exerted on a push button connected to a portion of the push latch mechanism positioned within the mobile device.

18. The method of claim 16, wherein the biometric verification means includes at least one processor in communication with any one of the following: fingerprint recognition means, hand geometry recognition means, palm geometry recognition means, iris recognition means, retina recognition means, and speech recognition means.

19. The method of claim 18, wherein said fingerprint recognition means includes a fingerprint scanner.

20. The method of claim 16, further comprising of at least one memory means for storing the biometric identifier.

21. The method of claim 16, wherein the remote hardware device includes but is not limited to a remote control, timer, and door entry device.

22. The method of claim 16, wherein the release mechanism comprises of any one of the following: push latch, thermo-magnetic push latch, electromagnetic push latch, magnetic push latch, or spring-loaded lever.

23. A method comprising of:
detecting a finger gesture, heat or pressure exerted on a touch screen display of a mobile device when the mobile device is in sleep mode or otherwise inactive, and for using at least one processor positioned within the mobile device, with computer executable instruction code executable by the at least one processor enabled for responding to the detected finger gesture, heat or pressure by activating a mechanical release mechanism positioned within the mobile device for releasing a retractable mechanical biometric verification means to extend outward from a concealed housing positioned within the mobile device for user authorization for activating the mobile device with a valid biometric identifier, wherein upon activation the biometric verification means retracts into the concealed housing;

activating a verification module executable by the at least one processor configured for verifying an image of user's biometric identifier to enable activating or initializing the mobile device for use; and activating a verification module executable by the at least one processors configured for verifying an image of user's biometric identifier when the mobile device is in sleep mode or for communicating user's authorization to access at least one application program or a remote hardware device that requires biometric verification.

24. The method of claim 23, further comprising detecting a finger gesture, heat or pressure exerted on a push button connected to a portion of the push latch mechanism positioned within the mobile device.

25. The method of claim 23, further comprising activating the mobile device upon validation of the biometric identifier from any one of the following: off or sleep mode.

26. The method of claim 23, further comprising executing the verification module for communicating user's biometric identifier to the at least one application program or remote hardware device.

27. The method of claim 23, wherein the biometric verification means includes at least one processor in communication with any one of the following: fingerprint recognition means, hand geometry recognition means, palm geometry recognition means, iris recognition means, retina recognition means, speech recognition means.

28. The method of claim 27, wherein said fingerprint recognition means includes a fingerprint scanner.

29. The method of claim 23, further comprising at least one memory means for storing the biometric identifier.

30. The method of claim 23, wherein the remote hardware device includes but is not limited to any one of the following: a remote control, timer, and door entry device.

31. The method of claim 23, wherein the release mechanism comprises of any one of the following: push latch, thermo-magnetic push latch, electromagnetic push latch, magnetic push latch, or spring-loaded lever.

* * * * *